(12) United States Patent
Cams

(10) Patent No.: US 11,860,437 B2
(45) Date of Patent: Jan. 2, 2024

(54) CABLE FIXATION ASSEMBLY WITH TIE WRAP PASSAGE HAVING PREFERRED INSERTION DIRECTION

(71) Applicant: COMMSCOPE TECHNOLOGIES LLC, Hickory, NC (US)

(72) Inventor: Eddy Luc Cams, Bilzen (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/761,115

(22) PCT Filed: Sep. 14, 2020

(86) PCT No.: PCT/US2020/050715
§ 371 (c)(1),
(2) Date: Mar. 16, 2022

(87) PCT Pub. No.: WO2021/055282
PCT Pub. Date: Mar. 25, 2021

(65) Prior Publication Data
US 2022/0404556 A1    Dec. 22, 2022

Related U.S. Application Data

(60) Provisional application No. 62/900,828, filed on Sep. 16, 2019.

(51) Int. Cl.
*G02B 6/44* (2006.01)
*H02G 3/32* (2006.01)
*G02B 6/36* (2006.01)

(52) U.S. Cl.
CPC .......... *G02B 6/44785* (2023.05); *H02G 3/32* (2013.01); *G02B 6/3616* (2013.01)

(58) Field of Classification Search
CPC .... G02B 6/4478; G02B 6/44785; H02G 3/32; B65D 63/1018–1081; F16L 3/233–2338
See application file for complete search history.

(56) References Cited

U.S. PATENT DOCUMENTS 4,805,856 A * 2/1989 Nicoli .................... F16L 3/233
                                                    292/307 R
6,185,792 B1 * 2/2001 Nelson ............... B65D 63/1072
                                                    24/17 AP
(Continued)

FOREIGN PATENT DOCUMENTS

DE    102008011762 A1 *  9/2009
DE    102013016760 A1 *  4/2015
(Continued)

OTHER PUBLICATIONS

International Search Report and Written Opinion of the International Searching Authority for International Patent Application No. PCT/US2020/050715 dated Jan. 12, 2021, 10 pages.
(Continued)

*Primary Examiner* — Michael Stahl
(74) *Attorney, Agent, or Firm* — Merchant & Gould P.C.

(57) ABSTRACT

Cable fixation assemblies for telecommunications systems. A cable support body of a cable fixation assembly defines a tie wrap passage. The tie wrap passage includes features that can improve tie wrap tightening control and/or a preferred tie wrap advancement direction when securing a cable to the cable support with the tie wrap.

25 Claims, 13 Drawing Sheets

(56) References Cited

U.S. PATENT DOCUMENTS

| | | | |
|---|---|---|---|
| 6,631,400 B1* | 10/2003 | DiStefano, III | G06Q 10/107 |
| | | | 709/206 |
| 2010/0092147 A1 | 4/2010 | Desard et al. | |
| 2012/0279745 A1* | 11/2012 | Badura | H01R 13/5812 |
| | | | 174/50 |
| 2014/0079366 A1 | 3/2014 | Rodriguez et al. | |
| 2020/0141518 A1* | 5/2020 | Nakano | H02G 3/30 |
| 2022/0120975 A1* | 4/2022 | Geens | G02B 6/3616 |
| 2022/0196959 A1* | 6/2022 | Cams | G02B 6/4432 |

FOREIGN PATENT DOCUMENTS

| | | |
|---|---|---|
| EP | 3 032 304 B1 | 11/2018 |
| JP | 2007227635 | 9/2007 |
| JP | 2008232222 | 10/2008 |
| WO | 00/72072 A1 | 11/2000 |
| WO | 02/073281 A1 | 9/2002 |
| WO | 2009/040566 A1 | 4/2009 |
| WO | 2012/121955 A1 | 9/2012 |
| WO | 2013/07746 A1 | 3/2013 |
| WO | 2013/149857 A1 | 10/2013 |
| WO | 2013/149922 A1 | 10/2013 |
| WO | 2017/114936 A1 | 7/2017 |
| WO | 2018/154125 A1 | 8/2018 |
| WO | 2018/208518 A1 | 11/2018 |
| WO | 2019/072782 A1 | 4/2019 |
| WO | 2019/072852 A1 | 4/2019 |
| WO | 2019/241502 A1 | 12/2019 |
| WO | 2020/104395 A1 | 5/2020 |
| WO | 2020/154418 A1 | 7/2020 |
| WO | 2020/219571 A1 | 10/2020 |

OTHER PUBLICATIONS

Extended EP Search Report for PCT/US2020/050715 dated Sep. 1, 2023 (8 pages).

* cited by examiner

CABLE FIXATION ASSEMBLY WITH TIE WRAP PASSAGE HAVING PREFERRED INSERTION DIRECTION

CROSS-REFERENCE TO RELATED APPLICATION

This application is a National Stage Application of PCT/US2020/050715, filed on Sep. 14, 2020, which claims the benefit of U.S. Patent Application Ser. No. 62/900,828, filed on Sep. 16, 2019, the disclosures of which are incorporated herein by reference in its their entireties. To the extent appropriate, a claim of priority is made to each of the above disclosed applications.

TECHNICAL FIELD

The present disclosure relates to fixing a portion of a telecommunications cable. In some examples, the telecommunications cable is fixed within an interior volume of a telecommunications closure.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, wave division multiplexers, fiber management trays, cable organizing and routing components, etc.

In certain applications, the enclosure/housing is water and contaminant (e.g., dust) proof or water-resistant. In particular, water, moisture, cleaning fluids, dust, etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. To accommodate cables entering the enclosure through ports in the enclosure wall, sealing members positioned at the port locations of the enclosure can define cable passages such that the sealing blocks form seals around the cables.

Typically, cables entering telecommunications enclosures must be fixed in place inside the enclosure. Within the closure, and depending on the type of cable, protective components of the cable, such as a jacket, a buffer tube, strength members, etc., are stripped, truncated, or removed, allowing the optical fibers held by the cable to be managed within the closure. One or more of these cable components may be fixed in place using a cable fixation assembly.

Fixing cables in telecommunications closures can be important to minimize damage to, or over-bending of, the exposed fibers within the closure.

In telecommunications closures and other applications, space is often limited and multiple cables must be fixed, often in parallel, in relatively densely packed groups with little space between adjacent cables. Interference between components of adjacent cables or adjacent cable fixation assemblies is generally undesirable.

SUMMARY

In general terms, the present disclosure is directed to improvements in the fixation of cables. The contents of PCT International Application No. PCT/US2020/014634 filed Jan. 22, 2020 are hereby incorporated by reference in their entirety. The contents of PCT International Application No. PCT/US2020/029356 filed Apr. 22, 2020 are hereby incorporated by reference in their entirety.

According to an aspect of the present disclosure, a cable support body of a cable fixation assembly is provided with at least one tie wrap passage that permits advancement of the tie wrap through the tie wrap passage in one direction and inhibits or prevents advancement of the tie wrap through the tie wrap passage in the reverse direction, thereby providing a preferred advancement direction.

Providing a preferred tie wrap advancement direction can facilitate proper positioning of the tie wrap relative to other cables. For example, multiple cables are often fixed in parallel in a relatively small space, such as a telecommunications closure. A tie wrap can be used to hold the cable to a cable fixation assembly. Such a tie wrap can include a relatively large head portion that is used to tighten the tie wrap by passing the tail portion of the tie wrap through the head portion. However, if the head portion is positioned at a side of the cable fixation assembly adjacent another cable, or adjacent an area where another cable may be fixed, cable fixation space and/or access to a cable or a part of a cable fixation assembly may be jeopardized or underutilized.

According an aspect of the present disclosure, a cable support body of a cable fixation assembly is provided with at least one tie wrap passage that resists self-advancement (e.g., by gravity) of the tie wrap through the tie wrap passage, while permitting pushed advancement (e.g., by hand) of the tie wrap through the tie wrap passage in a preferred advancement direction.

A tie wrap passage that resists self-advancement of the tie-wrap even in the preferred advancement direction can provide for controlled advancement of the tie wrap so that the tie wrap stays in a desired position relative to the cable or the cable fixation assembly for tightening the tie wrap. In addition, a tie wrap passage that resists self-advancement of the tie-wrap in the preferred direction can facilitate proper tightening of the tie wrap when using the tie wrap to also secure a yarn strength member of the cable.

As used herein, terms such as "vertical," "horizontal," "vertically," "horizontally," "up," "down," "top," "bottom," "upper," "lower," "front," "back," "rear," "proximal," "distal," etc., are used only for ease of description in relating the position or orientation of one component relative to another and regardless of how the overall apparatus (e.g., the closure) may be used, positioned, or oriented in practice. For example, vertically spaced apart components as described herein may be horizontally or otherwise spaced apart in practice depending on how the telecommunications closure is oriented in the field or while it is being serviced.

According to certain aspects of the present disclosure, a cable fixation assembly comprises: a cable support body extending between a first end and an opposite second end along a longitudinal axis of the cable support body, the cable support body defining a seat for seating a telecommunications cable; and a tie wrap passage defined by passage walls, the tie wrap passage extending through the cable support body generally transversely to the longitudinal axis from a first open end of the tie wrap passage to a second open end of the tie wrap passage, the tie wrap passage being configured such that when a tie wrap is advanced through the tie wrap passage from the first open end toward the second open end the tie wrap is resisted by the passage walls less than when the tie wrap is advanced through the tie wrap passage from the second end toward the first end.

According to further aspects of the present disclosure, a cable fixation assembly comprises: a cable support body extending between a first end and an opposite second end along a longitudinal axis of the cable support body, the cable support body defining a seat for seating a telecommunications cable; and a tie wrap passage defined by passage walls and including a main passageway, the tie wrap passage extending through the cable support body generally transversely to the longitudinal axis from a first open end of the tie wrap passage to a second open end of the tie wrap passage, the passage walls including a shoulder defining a closed ended branch passageway of the tie wrap passage, the closed ended branch passageway being open to the main passageway.

According to certain aspects of the present disclosure, a cable fixation assembly in accordance with the present disclosure is secured to a sealable telecommunications closure.

According to certain aspects of the present disclosure, a method comprises: providing a cable fixation assembly according to any of claims 1-11, a telecommunications cable, and a tie wrap; placing an outer jacket of the telecommunications cable on the seat; inserting the tie wrap in the first open end and advancing the tie wrap through the tie wrap passage toward and through the second open end; and tightening the tie wrap around the outer jacket of the telecommunications cable.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
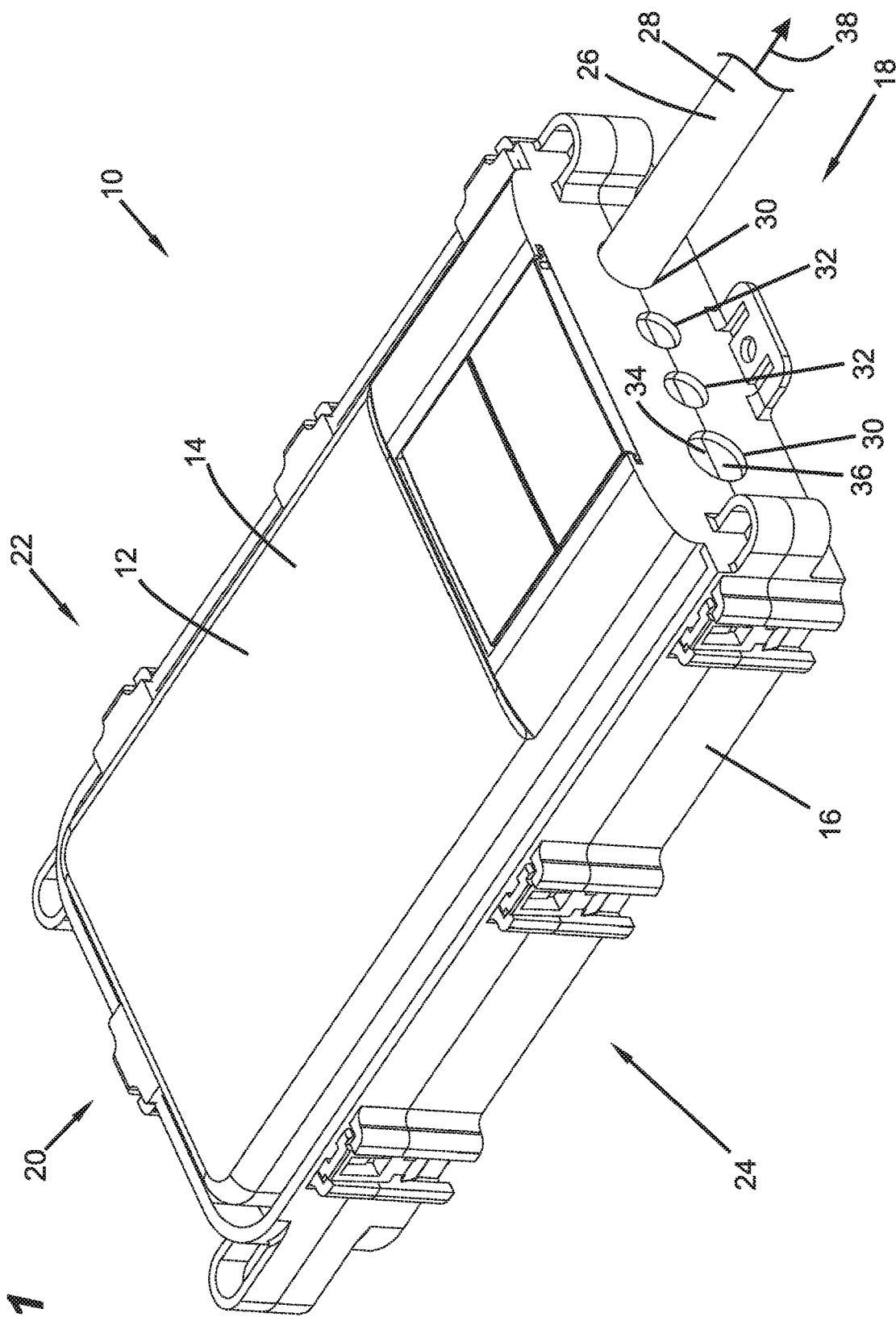
FIG. 1 is a perspective view of an example telecommunications system including a telecommunications closure and a cable in accordance with the present disclosure, the closure being in a closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
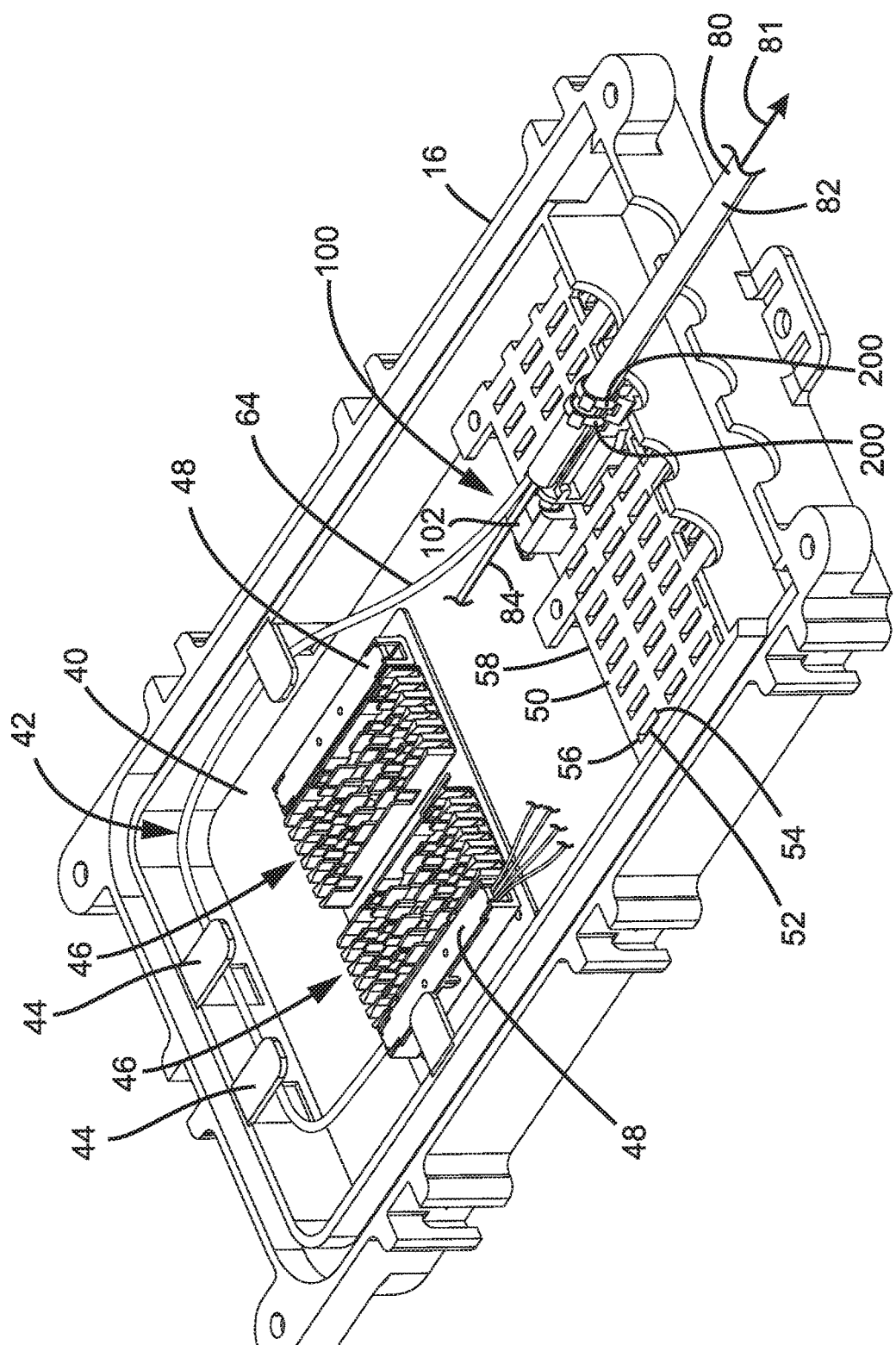
FIG. 2 is a perspective view of a cable and a portion of the closure of FIG. 1, the closure being in an open configuration, and showing an example cable fixation assembly in accordance with the present disclosure.

Referring to FIGS. 1-2, a telecommunications system 10 includes a closure 12 having a first housing piece 14 and a second housing piece 16 configured to cooperate with each other to form the closure 12 that is re-enterable and re-closable. Sealing members are disposed to form a seal between the housing pieces when the closure 12 is closed, thereby minimizing ingress of contaminants (e.g., moisture, dust, etc.) into the interior volume 40 of the closure 12. The closure extends from a proximal end 18 to a distal end 20, and has a top 22, and a bottom 24.

An example telecommunications cable 26 (e.g., a feeder cable) enters the interior volume 40 of the closure 12 through a port 30 defined by the housing pieces 14 and 16. The cable 26 is defined by a longitudinal cable axis 38 and includes an outer jacket 28 that radially surrounds the cable axis 38 and protects and provides structural support to the cable, and particularly to the one or more optical fibers carried by the cable. The housing pieces define a plurality of ports 30, 32 through which cables can enter the closure. The outer ports 30 are configured to receive relatively large cables, such as feeder cables, while the inner ports 32 are configured to receive relatively small cables, such as drop cables or distribution cables. Positioned at the ports and between the housing pieces 14 and 16 are cable port seal blocks 34, 36 that can seal around the cables as they enter the closure and/or seal off the ports where no cable is present.

The interior volume 40 includes a fiber management area 42 that includes fiber management devices and structures such as fiber retainers 44, splice holders 46 and splitter holders 48. Optical fibers, such as the optical fiber 64 entering the interior volume 40 via a cable 80 (having a longitudinal cable axis 81, an outer jacket 82, and strength member 84) are routed to the fiber management area 42 where they are managed, e.g., by storing them in loops, splicing them to other fibers, splitting them with splitters, etc. It should be appreciated that the fibers can be individual fibers or groups of fibers. Groups of fibers can be loosely bundled, e.g., in protection tubes, or connected, such as in the case of ribbon fibers.

Connected to the housing piece 16 and within the interior volume 40 is a base plate 50. The base plate 50 includes a plurality of elongate slots 52 elongated in the proximal to distal direction and extending between a proximal slot end 56 and a distal slot end 54 of the slot 52. The slots 52 extend through a thickness of the base plate 50, extending between the top surface 58 and an opposite bottom surface of the base plate 50.

Mounted to the base plate 50 is a cable fixation assembly 100 in accordance with the present disclosure. The cable fixation assembly 100 includes a cable support body 102 supporting a cable 80. The cable 80 is anchored to the cable fixation assembly 100.

Referring now to FIGS. 3-9, the cable support body 102 is elongate along a longitudinal axis 104, extending between a proximal end 106 and a distal end 108 along the longitudinal axis 104. The cable support body 102 has a maximum side to side width W measured transverse to the longitudinal axis between sides 110 and 112 of the cable support body 102. The cable support body 102 extends vertically from a top 114 of the cable support body 102 to a bottom 116 of the cable support body 102.

In some examples, the cable support body 102 is a unitary molded polymer structure. In some examples, the cable support body 102 includes metal.

The cable support body 102 defines a seat 118 having a horizontal cable support surface 120 facing vertically upwards and walls 122. The seat 118 is configured to seat a portion of the cable 80 such that the cable can be fixed to the cable support body 102 using the tie wraps 200.

The cable support body 102 includes legs 124 with feet 126 extending from the legs. The legs 124 and feet 126 are configured to engage the slots 52 of the base plate 50 (FIG. 2) to mount the cable support body 102 to the base plate 50. A slot-engageable locking member 128 is positioned proximally to one of the feet 126 and configured to enter the same slot as the corresponding foot to minimize or prevent undesired proximally directed shifting of the cable support body 102 once it is mounted to the base plate 50.

The cable support body 102 includes a strength member anchor including a radial channel 130 and a longitudinal channel 133. For example, the strength member 84 can be a fibrous material (e.g., a yarn, aramid yarn) that can be placed in the radial channel 130 and the longitudinal channel 133, and a free end portion of the yarn strength member can be folded over the more proximal tie wrap 200 and under the more distal tie wrap 200 to secure the strength member 84 to the cable support body 102.

A coupler 131 (e.g., a latch arm) can be provided for lockingly engaging a strength member anchor adapter for anchoring a rigid strength rod. For example, the strength member 84 can be a rigid rod that cannot be fed through the radial and longitudinal channels 130, 131, and instead requires anchoring via a strength member anchor adapter.

A pair of tie wrap passages 132 are provided, with each tie wrap passage being defined by passage walls 134a, 134b, 134c, 134d, 134e, 134f (collectively, 134a-134f). A dividing wall 190 separates the two passages 132 from each other so that they are not open to each other parallel to the axis 104.

The tie wrap passage 132 extends through the cable support body 102 generally transversely to the longitudinal axis 104 from a first open end 136 of the tie wrap passage 132 to a second open end 138 of the tie wrap passage 132.

The tie wrap passage 132 is configured such that when a tie wrap 200 is advanced through the tie wrap passage from the first open end 136 toward the second open end 138 the tie wrap is resisted by one or more of the passage walls 134a-134f less than when the tie wrap 200 is advanced through the tie wrap passage 132 from the second open end 138 toward the first open end 136, thus providing a preferred insertion and advancement direction of the tie wrap 200 through the tie wrap passage 132.

The tie wrap passage 132 includes a main passageway 140. A shoulder 142 defined by the passage walls 134a, 134b, and 134c itself defines a closed ended branch passageway 143 of the tie wrap passage 132. The closed ended branch passageway 143 is open to the main passageway 140.

The branch passageway 143 is generally aligned with the second open end 138 of the tie wrap passage 132 and generally not aligned with the first open end 136 of the tie wrap passage 132. Thus, when inserting the tail portion 202 of the tie wrap 200 starting from the tip 204 of the tie wrap 200 (FIG. 12) into the second open end 138 and advancing the tail portion 202 toward the first open end 136, the tip 204 engages the wall 134d, which forms the closed end 144 of the closed ended branch passageway 143, preventing further advancement of the tail portion 202 towards the first open end 136. When inserting the tail portion 202 of the tie wrap 200 starting from the tip 204 of the tie wrap 200 (FIG. 12) into the first open end 136 and advancing the tail portion 202 toward the second open end 138, the tail portion 202 bypasses the closed ended branch passageway 143, and can be advanced relatively unimpeded to the second open end 138. Thus, advancement of the tie wrap 200 from the first open end 136 to the second open end 138 is the preferred advancement direction. This advancement direction is preferred due to the higher tendency for the tie wrap head portion to be positioned at a side of the cable support if the tie wrap were successfully inserted and fully advanced through the tie wrap passage in the non-preferred direction.

The first and second open ends are open to directions D1 and D2, respectively, that form an angle with each other that is less than 180 degrees.

The passage wall 134e is a ramp 146 oriented neither horizontally nor vertically leading from the second open end 137 at a partially upward angle to the closed end 144 of the closed ended branch passageway 143, such that the ramp 146 is angled toward the first open end 136 as it leads away from the second open end 138.

Another ramp 148 leads from the first open end 136 at a partially downward angle to a ledge 150 defined by the shoulder 142 such that the ramp 148 is angled toward the second open end 138 as it leads away from the first open end 136.

The passage wall 134c acts as a guide surface 152 that is positioned opposite the shoulder 142 and configured to cause the tail portion 202 of the tie wrap 200 to bend as it is advanced through the tie wrap passage from the first open end toward the second open end engages the guide surface 152. A resilience of the tail portion 202 of the tie wrap 200 causes the tail portion 202 to push against the guide surface 152, generating friction that can reduce or eliminate the tie wrap's ability to self-advance (e.g., by gravity) through the tie wrap passage 132, while permitting advancement by a pushing force that exceeds the frictional force between the guide surface 152 and the tail portion 202 of the tie wrap 200. This improved control of tie wrap advancement through the tie wrap passage 132 facilitates proper placement of the relatively bulbous head portion 206 (FIGS. 12-13) of the tie wrap 200 when securing a cable 80 to the cable support body 102 using the tie wrap 200. In addition, the improved control can facilitate proper tightening of the tie wraps 200 about a yarn strength member of a cable to anchor the yarn strength member, e.g., to the cable support body.

Figure 12:
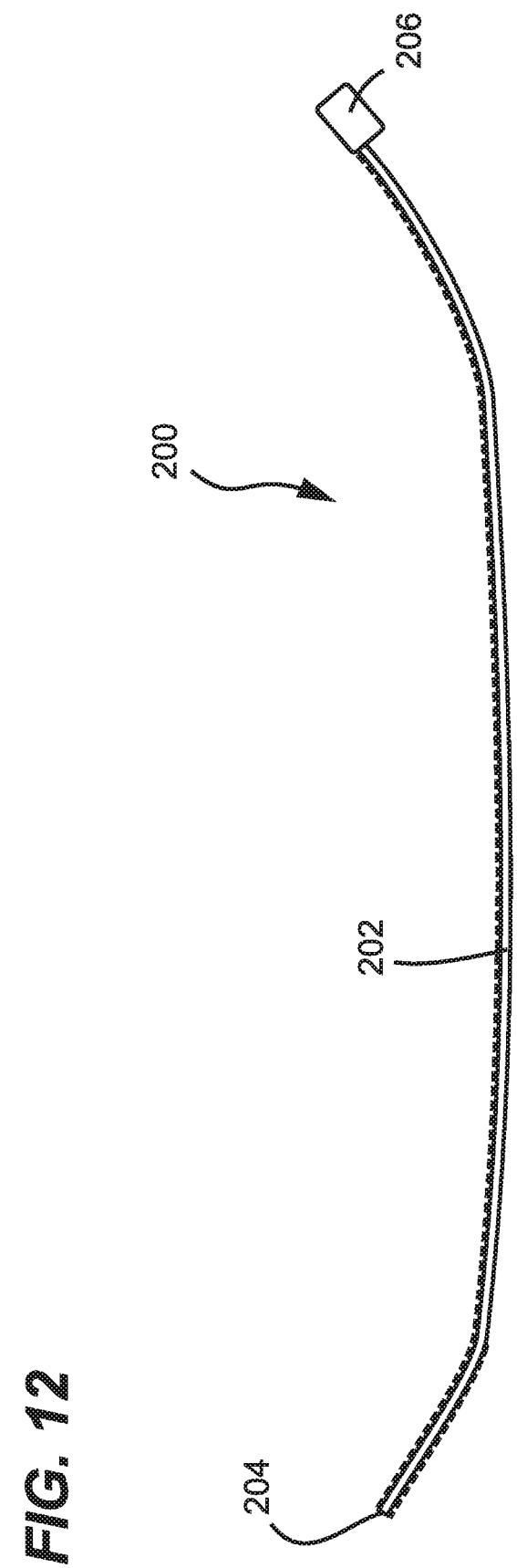
FIG. 12 is a perspective view of one of the tie wraps of FIG. 3, the tie wrap being in a tie wrap passage insertable configuration.
Figure 13:
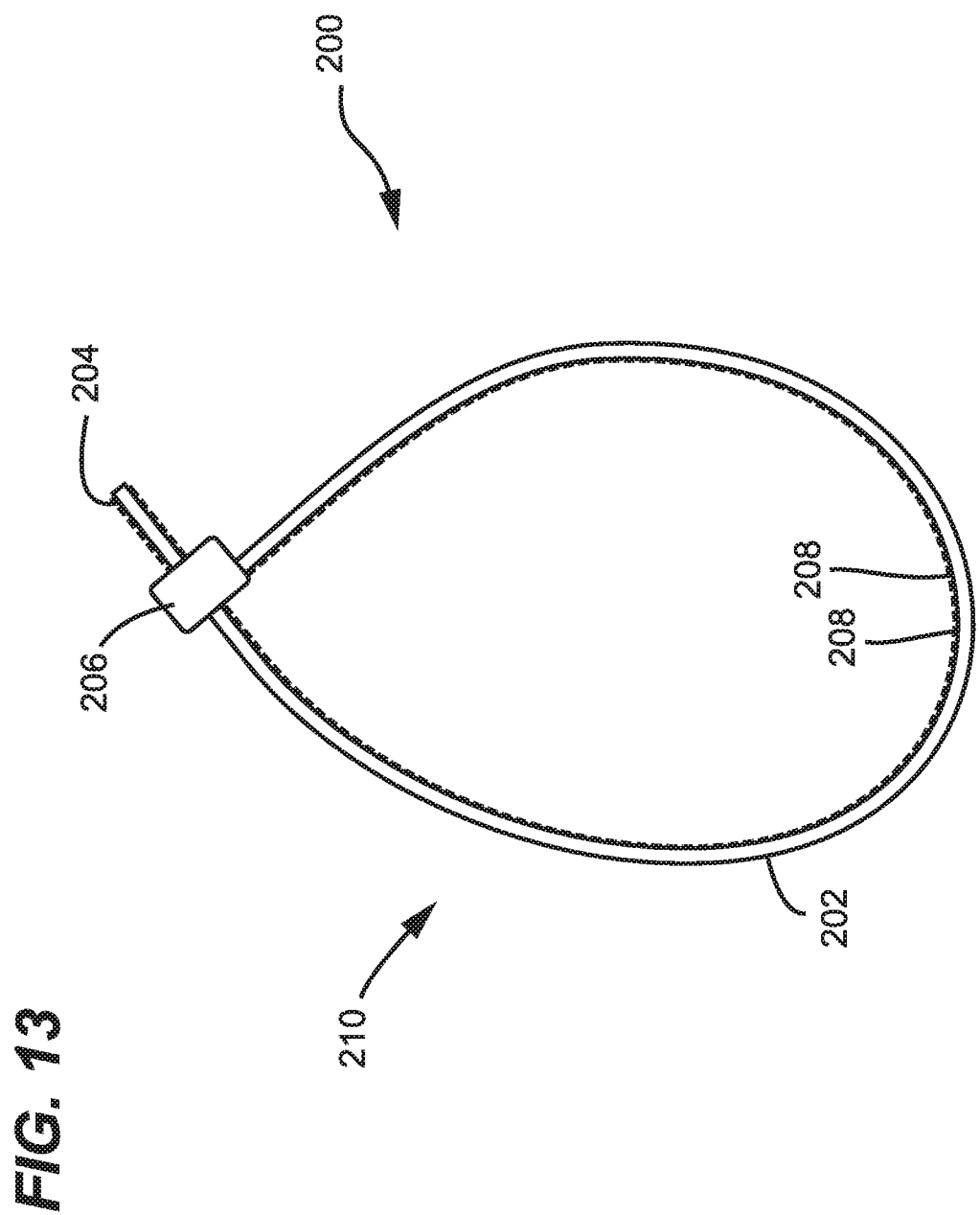
FIG. 13 is a perspective view of the tie wrap of FIG. 12 in a tightening configuration.

Referring to FIGS. 12-13 the tail portion 202 includes teeth 208 that engage a pawl in the head portion 206. The teeth 208 and pawl cooperate as a ratcheting mechanism as the tail portion 202 is advanced through a slot in the head portion 206, thereby allowing a loop 210 formed by the tail portion 202 to be tightened around the cable 80 and the cable support body 102.

Figure 3:
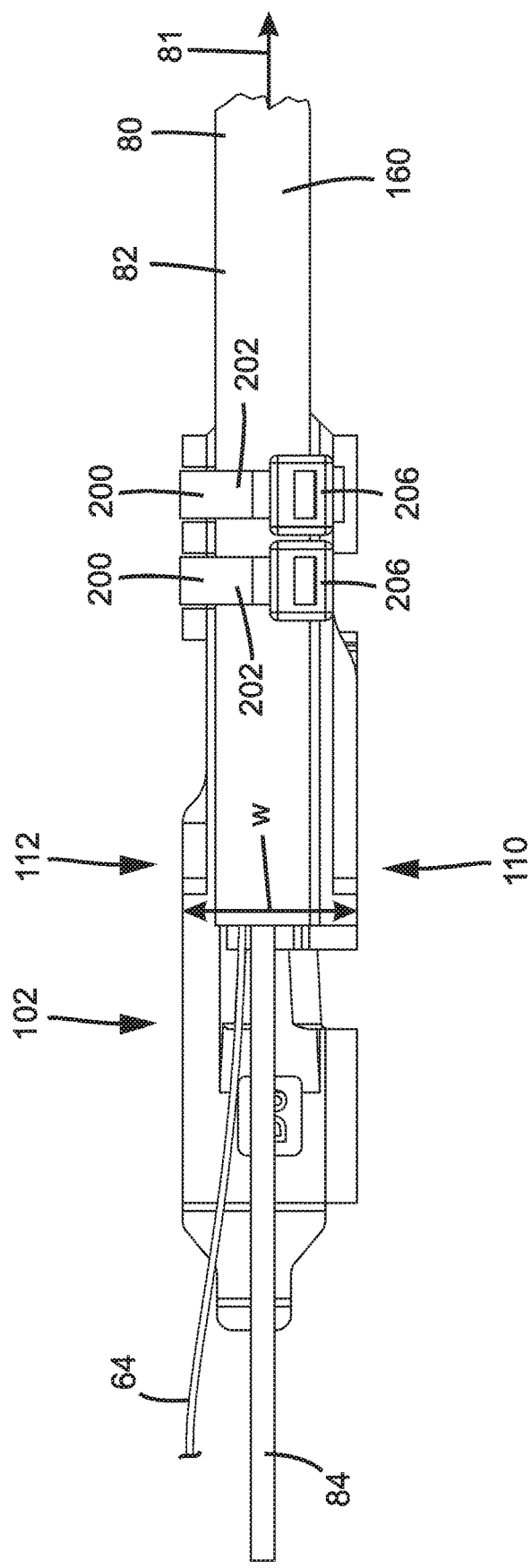
FIG. 3 is a top view of a portion of the cable fixation assembly of FIG. 2, including a cable fixed to the cable fixation assembly with tie wraps.
Figure 4:
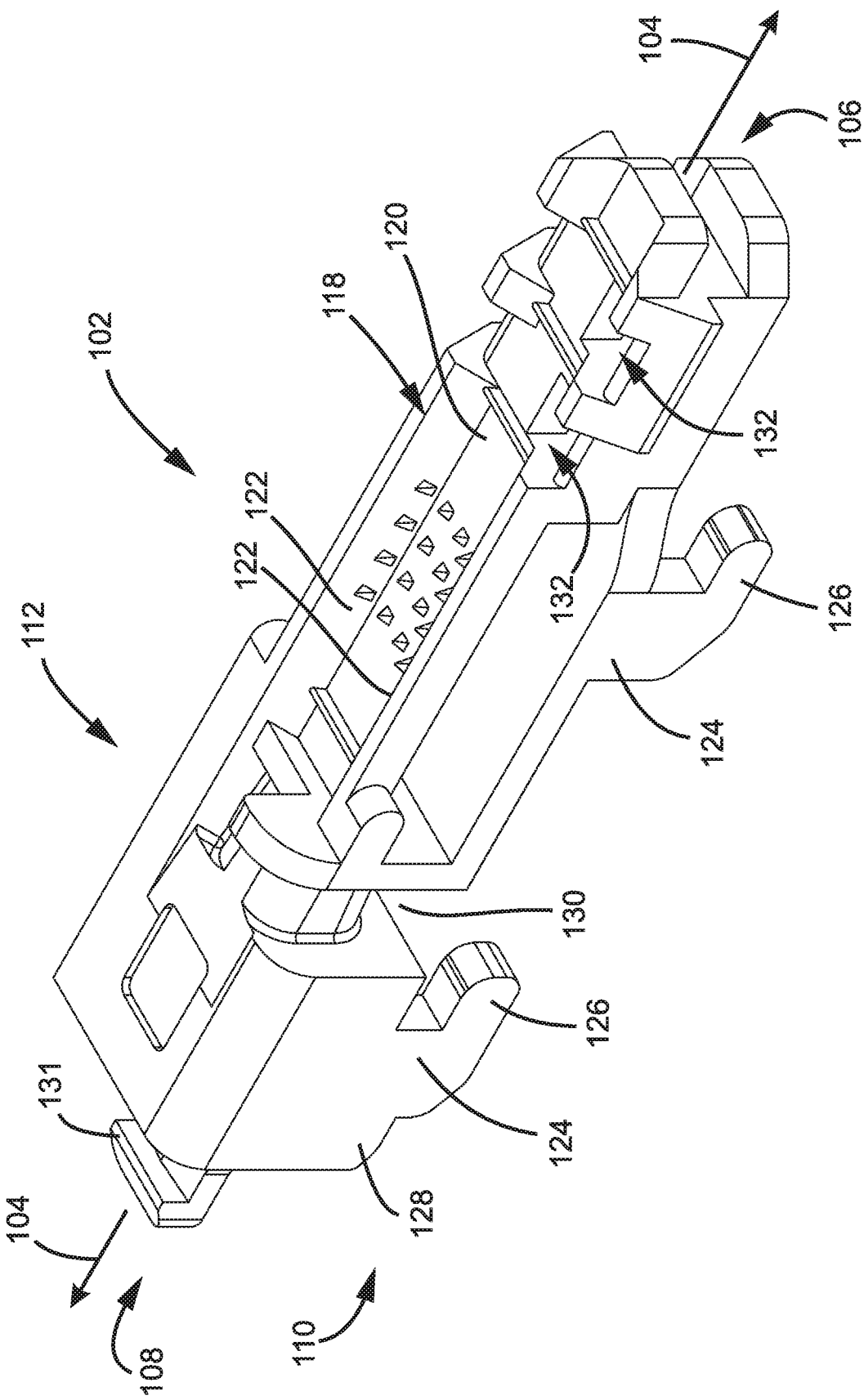
FIG. 4 is a perspective view of the cable support body of the cable fixation assembly of FIG. 2.
Figure 5:
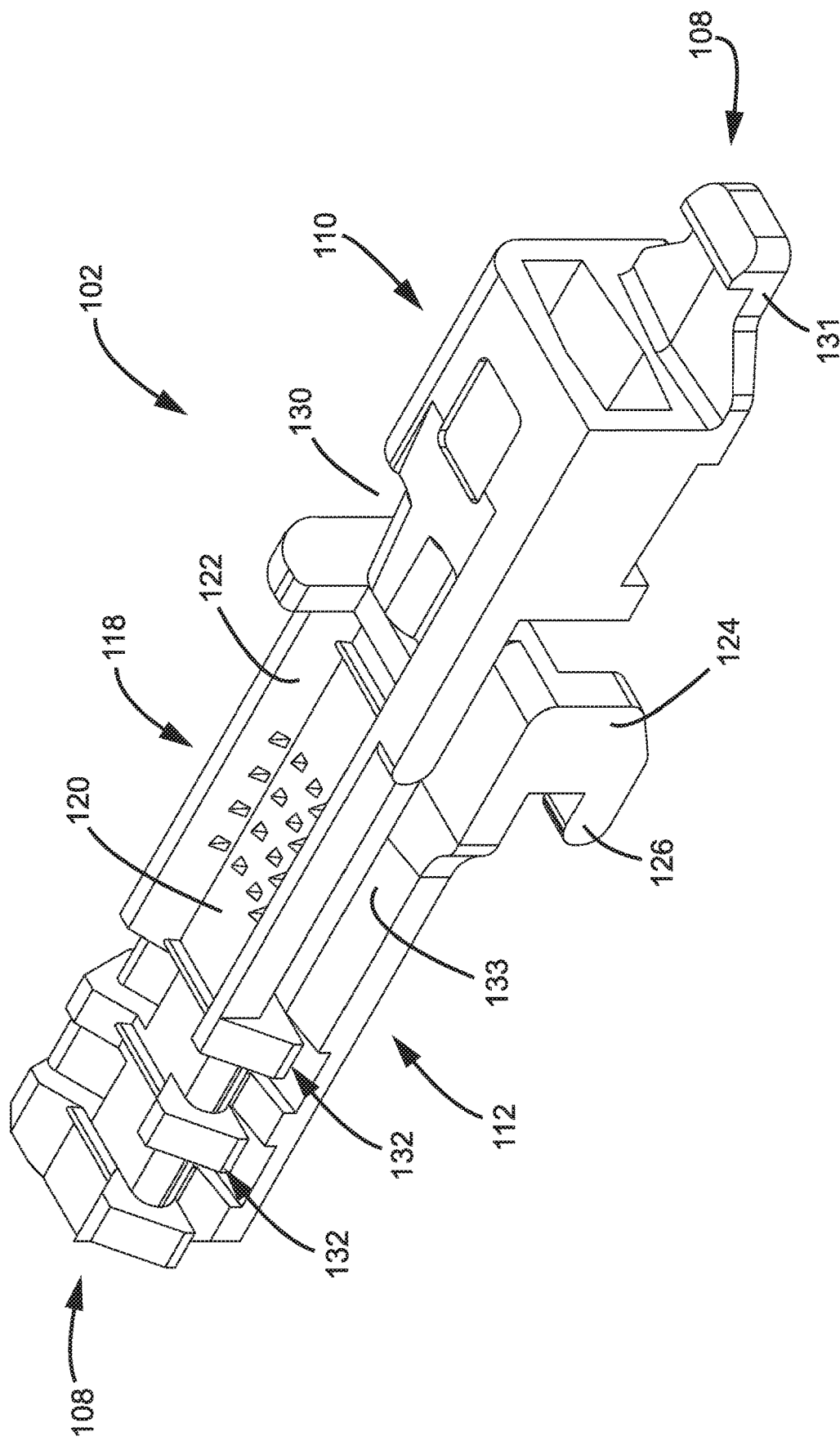
FIG. 5 is a further perspective view of the cable support body of the cable fixation assembly of FIG. 2.
Figure 6:
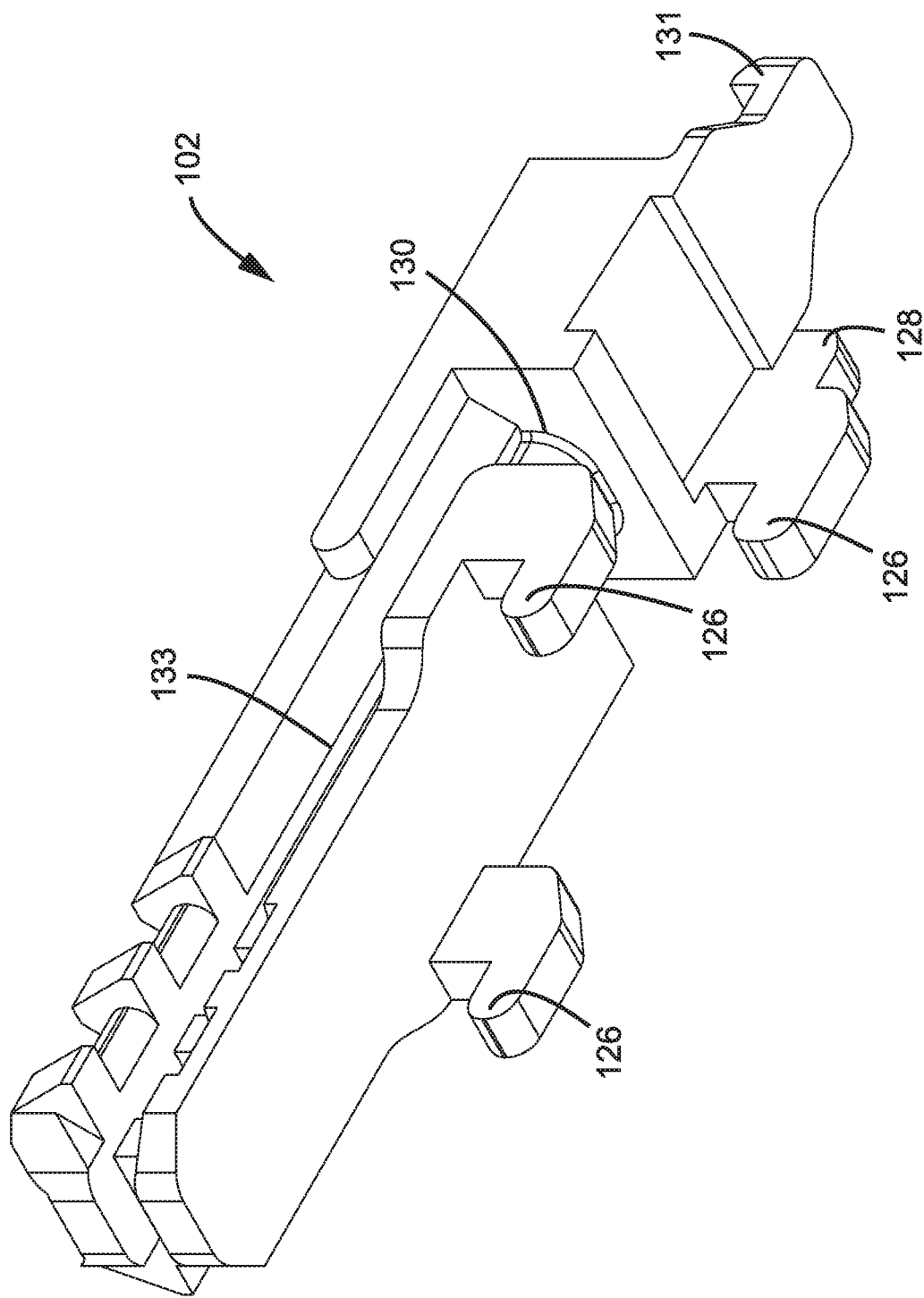
FIG. 6 is a further perspective view of the cable support body of the cable fixation assembly of FIG. 2.
Figure 7:
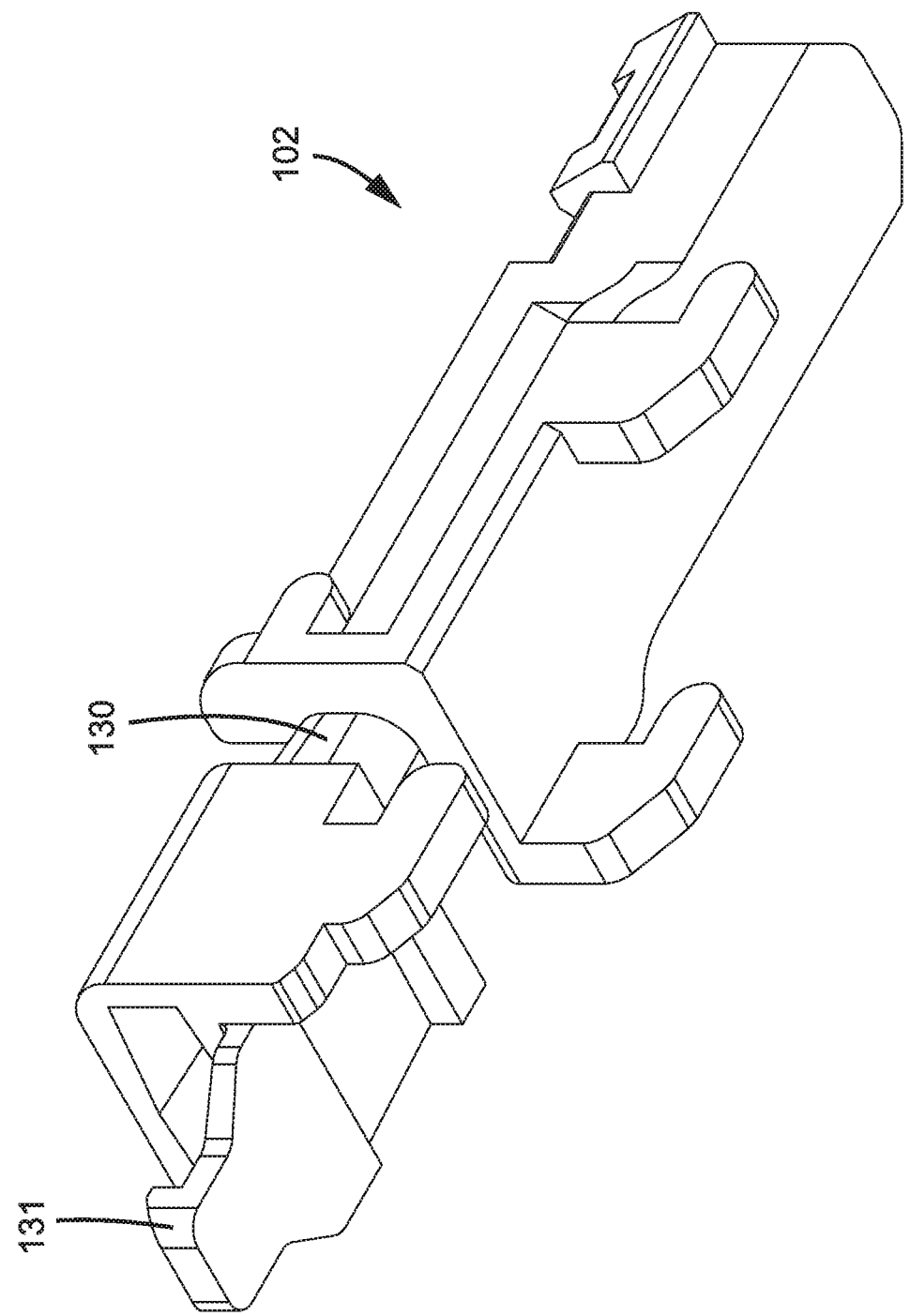
FIG. 7 is a further perspective view of the cable support body of the cable fixation assembly of FIG. 2.
Figure 8:
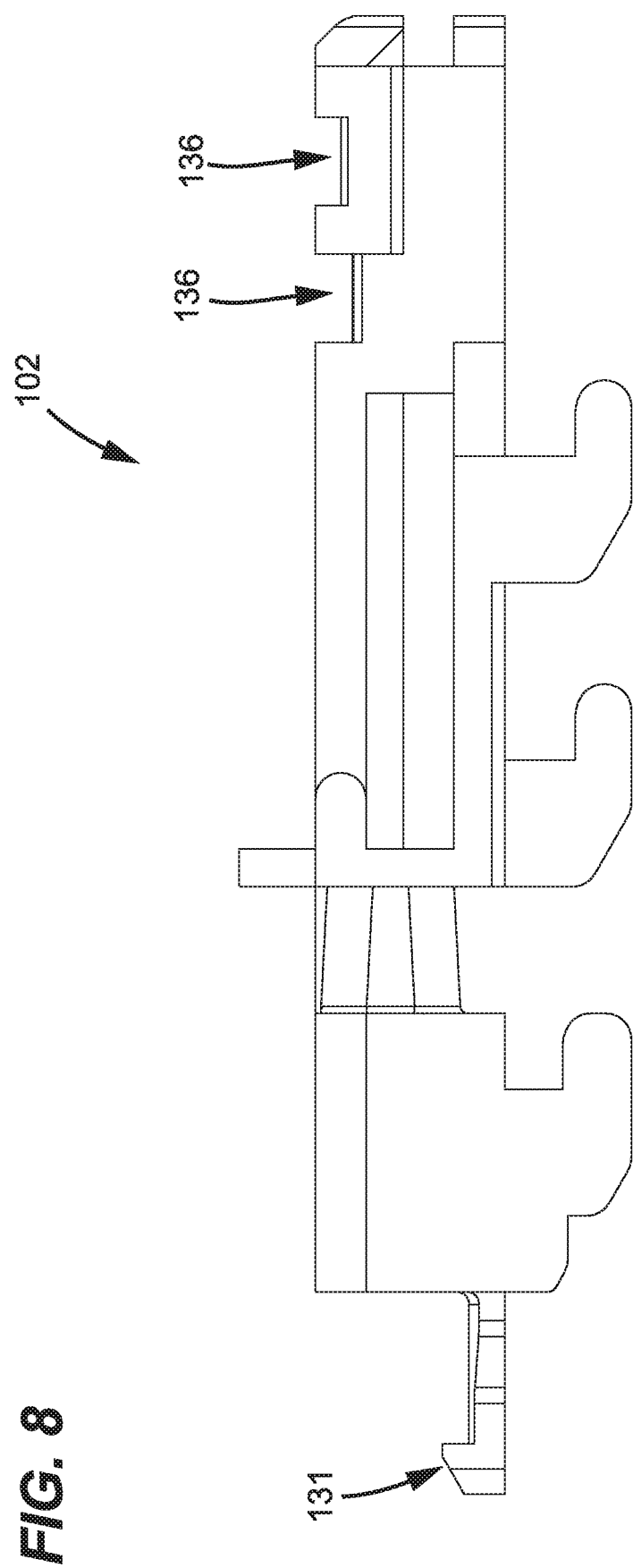
FIG. 8 is a side view of the cable support body of the cable fixation assembly of FIG. 2.
Figure 9:
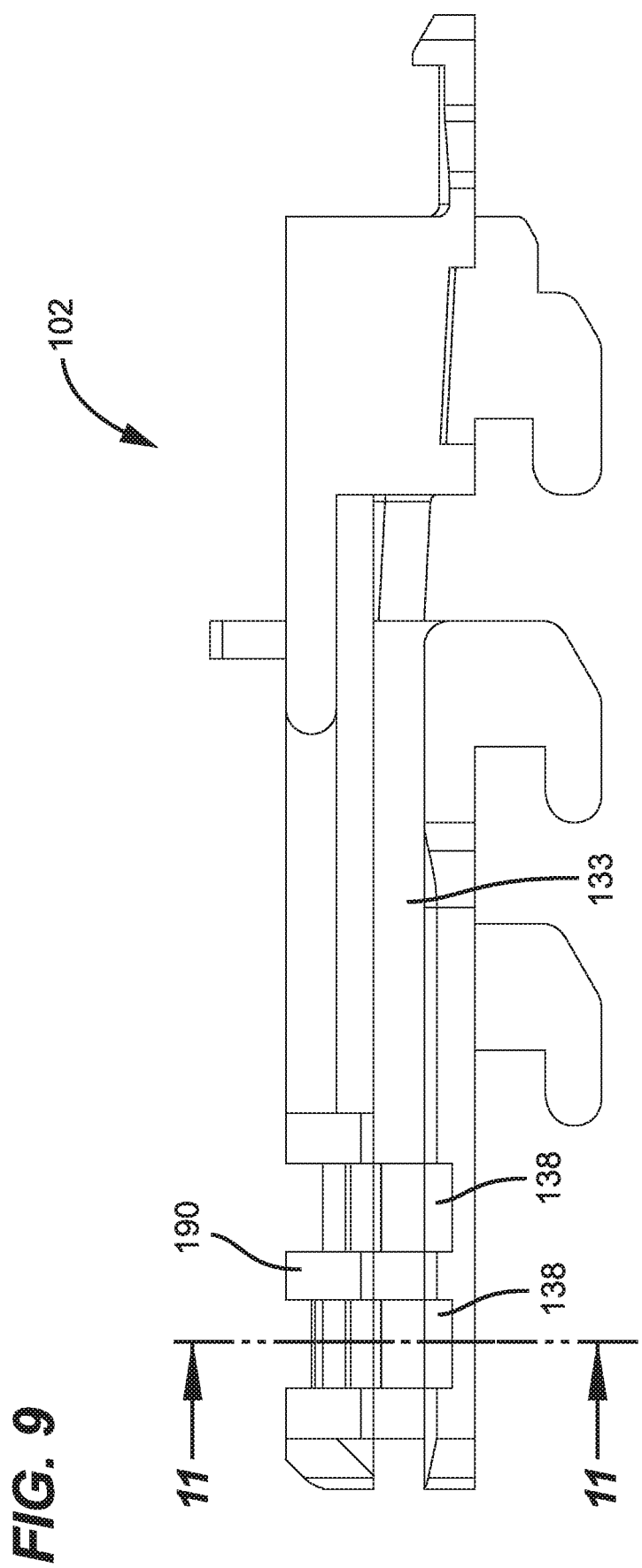
FIG. 9 is a further side view of the cable support body of the cable fixation assembly of FIG. 2.
Figure 10:
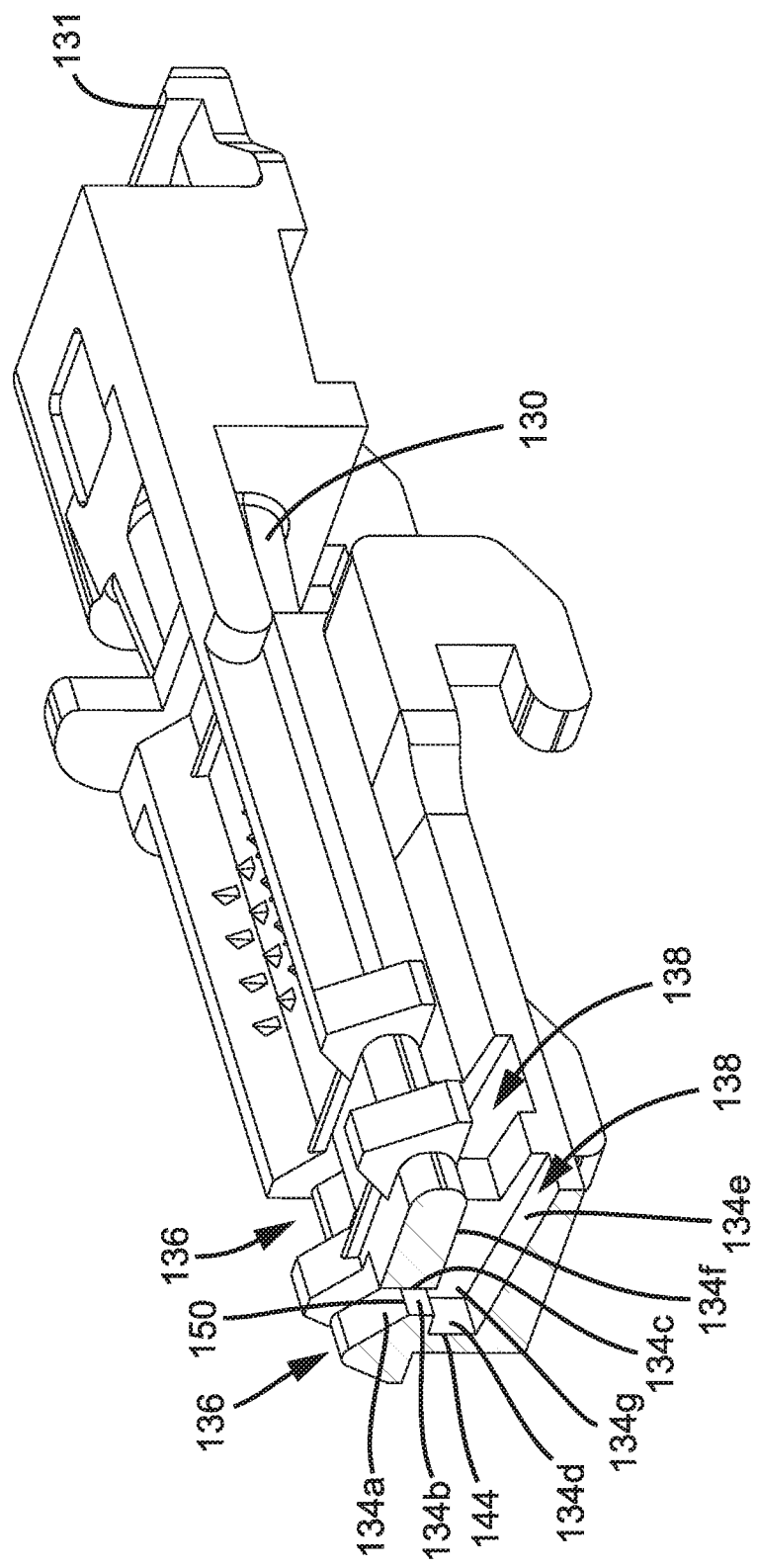
FIG. 10 is a cross-sectional perspective view of the cable support body of the cable fixation assembly of FIG. 2 along the line 11-11 in FIG. 9.
Figure 11:
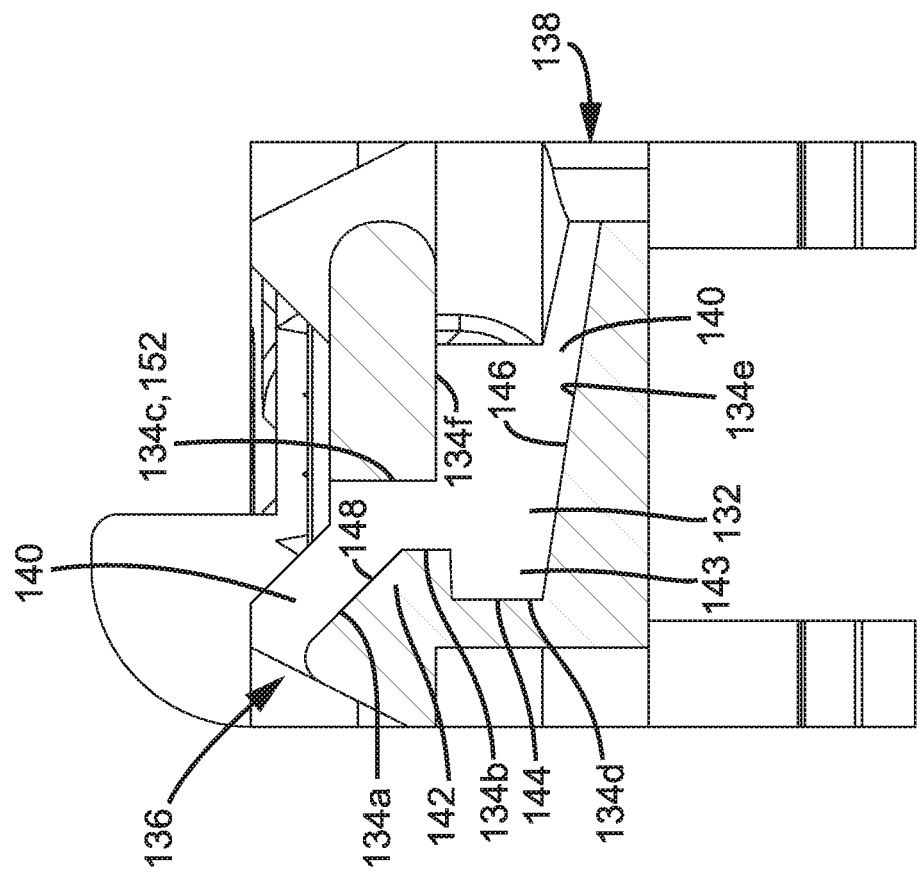
FIG. 11 is a cross-sectional end view of the cable support body of the cable fixation assembly of FIG. 2 along the line 11-11 in FIG. 9.

As shown in FIG. 3, the head portions 206 of the tie wraps 200 are properly positioned near the top 160 of the cable 80. The head portions 206 can also be properly positioned at the top 160 of the cable 80. This positioning of the head portions 206 is facilitated by each of the preferred advancement direction and the improved control provided by the tie wrap passages described above. Due to the positioning of the head portions 206, no portion of the tie wrap 200 extends horizontally beyond the horizontal width W of the cable support body 102. Thus, the tie wraps 200 do not increase the horizontal profile of the cable fixation assembly 100, providing for more access/working space between the cable fixation assembly 100 and an adjacent cable fixation assembly or other structure.

The tie wrap 200 can be a ratcheting zip tie. In other examples, the tie wrap can be anything suitable for feeding through the tie wrap passage and tightening about a cable and the cable support body. Non-limiting examples of the tie wrap can include a twist tie, a string, a rope, a metal band, a hose clamp, etc.

From the foregoing detailed description, it will be evident that modifications and variations can be made in the devices of the disclosure without departing from the spirit or scope of the invention.

What is claimed is:

1. A cable fixation assembly, comprising:
a cable support body extending between a first end and an opposite second end along a longitudinal axis of the cable support body, the cable support body defining a seat for seating a telecommunications cable; and
a tie wrap passage defined by passage walls, the tie wrap passage extending through the cable support body generally transversely to the longitudinal axis from a first open end of the tie wrap passage to a second open end of the tie wrap passage, the tie wrap passage being configured such that when a tie wrap is advanced through the tie wrap passage from the first open end toward the second open end the tie wrap is resisted by the passage walls less than when the tie wrap is advanced through the tie wrap passage from the second open end toward the first open end,
wherein the cable support body includes a plurality of legs configured to be received in a plurality of slots of a base plate to mount the cable support body to the base plate.

2. A cable fixation assembly, comprising:
a cable support body extending between a first end and an opposite second end along a longitudinal axis of the cable support body, the cable support body defining a seat for seating a telecommunications cable; and
a tie wrap passage defined by passage walls and including a main passageway, the tie wrap passage extending through the cable support body generally transversely to the longitudinal axis from a first open end of the tie wrap passage to a second open end of the tie wrap passage, the passage walls including a shoulder defining a closed ended branch passageway of the tie wrap passage, the closed ended branch passageway being open to the main passageway.

3. The cable fixation assembly of claim 2, wherein the branch passageway is generally aligned with the second open end of the tie wrap passage, and wherein the branch passageway is generally not aligned with the first open end of the tie wrap passage.

4. The cable fixation assembly of claim 1, wherein the first and second open ends are open to directions that form an angle with each other that is less than 180 degrees.

5. The cable fixation assembly of claim 2, wherein the passage walls define a ramp leading from the second open end to a closed end of the closed ended branch passageway.

6. The cable fixation assembly of claim 5, wherein the seat includes a main horizontal surface, and wherein at least a portion of the ramp is not horizontal, such that the ramp is angled toward the first open end.

7. The cable fixation assembly of claim 2, wherein the passage walls define a ramp leading from the first open end to a ledge defined by the shoulder.

8. The cable fixation assembly of claim 7, wherein the seat includes a main horizontal surface, and wherein at least a portion of the ramp is not horizontal, such that the ramp is angled toward the second open end.

9. The cable fixation assembly of claim 5, wherein the ramp is a first ramp, and wherein the passage walls define a second ramp leading from the first open end to a ledge defined by the shoulder.

10. The cable fixation assembly of claim 9, wherein the seat includes a main horizontal surface, and wherein at least a portion of the ramp is not horizontal, such that the ramp is angled toward the second open end.

11. The cable fixation assembly of claim 1, comprising a plurality of tie wrap passages.

12. The cable fixation assembly of claim 1, further comprising the telecommunications cable seated on the seat, and the tie wrap extending through the tie wrap passage and around a portion of the telecommunications cable, the tie wrap securing the telecommunications cable to the cable support body.

13. The cable fixation assembly of claim 12, wherein the tie wrap includes a tail portion and a head portion that receives the tail portion, wherein the cable support body includes first and second sides defining a horizontal width perpendicular to the longitudinal axis, wherein the seat is at a vertical top of the cable support body, and wherein no portion of the head portion of the tie wrap is positioned outside of the horizontal width of the cable support body.

14. The cable fixation assembly of claim 1, wherein the passage walls include a guide surface positioned and configured to bend the tie wrap as it is advanced through the tie wrap passage from the first open end toward the second open end.

15. The cable fixation assembly of claim 7, wherein the passage walls include a guide surface positioned opposite the ledge and configured to bend the tie wrap as it is advanced through the tie wrap passage from the first open end toward the second open end.

16. A telecommunications closure, comprising:
the cable fixation assembly of claim 1; and
the base plate, the plurality of legs being received in the slots to mount the cable support body to the base plate.

17. The telecommunications closure of claim 16, further comprising first and second housing pieces configured to cooperate to provide a sealable interior volume of the closure, and wherein the base plate is secured to one of the housing pieces within the sealable interior volume.

18. The telecommunications closure of claim 17, further comprising the telecommunications cable fixed to the cable support body with at least one tie wrap, and wherein the telecommunications cable enters the sealable interior volume of the closure through a sealed cable port defined by one or more of the first and second housing pieces.

19. The closure of claim 18, wherein the at least one tie wrap is a zip tie.

20. The cable fixation assembly of claim 12, wherein the tie wrap is a zip tie.

21. The cable fixation assembly of claim 1, A cable fixation assembly, comprising:
   a cable support body extending between a first end and an opposite second end along a longitudinal axis of the cable support body, the cable support body defining a seat for seating a telecommunications cable; and
   a tie wrap passage defined by passage walls, the tie wrap passage extending through the cable support body generally transversely to the longitudinal axis from a first open end of the tie wrap passage to a second open end of the tie wrap passage, the tie wrap passage being configured such that when a tie wrap is advanced through the tie wrap passage from the first open end toward the second open end the tie wrap is resisted by the passage walls less than when the tie wrap is advanced through the tie wrap passage from the second open end toward the first open end,
   wherein the cable support body includes an anchor for anchoring a strength member of the telecommunications cable.

22. A method, comprising:
   providing a cable fixation assembly, a telecommunications cable, and a tie wrap, the cable fixation assembly including:
      a cable support body extending between a first end and an opposite second end along a longitudinal axis of the cable support body, the cable support body defining a seat for seating the telecommunications cable; and
      a tie wrap passage defined by passage walls, the tie wrap passage extending through the cable support body generally transversely to the longitudinal axis from a first open end of the tie wrap passage to a second open end of the tie wrap passage, the tie wrap passage being configured such that when a tie wrap is advanced through the tie wrap passage from the first open end toward the second open end the tie wrap is resisted by the passage walls less than when the tie wrap is advanced through the tie wrap passage from the second open end toward the first open end,
   placing an outer jacket of the telecommunications cable on the seat;
   inserting the tie wrap in the first open end and advancing the tie wrap through the tie wrap passage toward and through the second open end; and
   tightening the tie wrap around the outer jacket of the telecommunications cable,
   wherein the seat is at a vertical top of the cable support body, and wherein the tightening is performed such that a head portion of the tie wrap is positioned within a horizontal width of the cable support body.

23. The method of claim 22, further comprising, subsequent to the tightening, mounting the cable support body to a base plate.

24. The method of claim 23, wherein the mounting includes inserting legs of the cable support body into slots of the base plate.

25. The method of claim 22, further comprising, prior to the inserting the tie wrap:
   inserting the tie wrap through the tie wrap passage from the second open end toward the first open end;
   detecting resistance by the passage walls against the tie wrap; and
   subsequent to the detecting, removing the tie wrap from the tie wrap passage.

\* \* \* \* \*